United States Patent [19]

Heizer, Jr.

[11] Patent Number: 4,787,339

[45] Date of Patent: Nov. 29, 1988

[54] AUTOMATIC HEADGATE FOR LIVESTOCK

[76] Inventor: Marshall B. Heizer, Jr., Rte. 1, Box 21, Rawlings, Va. 23876

[21] Appl. No.: 92,300

[22] Filed: Sep. 2, 1987

[51] Int. Cl.⁴ .............................................. A61D 3/00
[52] U.S. Cl. .................................... 119/98; 119/147 R
[58] Field of Search ............ 119/98, 99, 147 R, 147 A

[56] References Cited

U.S. PATENT DOCUMENTS

| | | | |
|---|---|---|---|
| 3,099,249 | 7/1963 | Newhouse, Jr. | 119/99 |
| 3,229,666 | 1/1966 | Sedevie | 119/147 X |
| 4,116,166 | 9/1978 | Gofflot | 119/99 |
| 4,357,906 | 11/1982 | Kratky | 119/98 |

Primary Examiner—Robert P. Swiatek
Attorney, Agent, or Firm—Norman B. Rainer

[57] ABSTRACT

A livestock headgate is provided having certain automatic features of operation and capability for adjustment to the size of the livestock. The headgate utilizes two vertically elongated swinging frameworks which are coupled so that when one framework is swung to the forward discharge position, the second framework follows. The frameworks, in their coplanar closed positions, permit the animal's head to pass therebetween. When the animal's shoulder touches one of the frameworks, an upright member under tension is caused to rapidly close upon the neck of the animal. When the frameworks are swung to the forward discharge position, the tensioned member is automatically restored to its starting position.

5 Claims, 5 Drawing Sheets

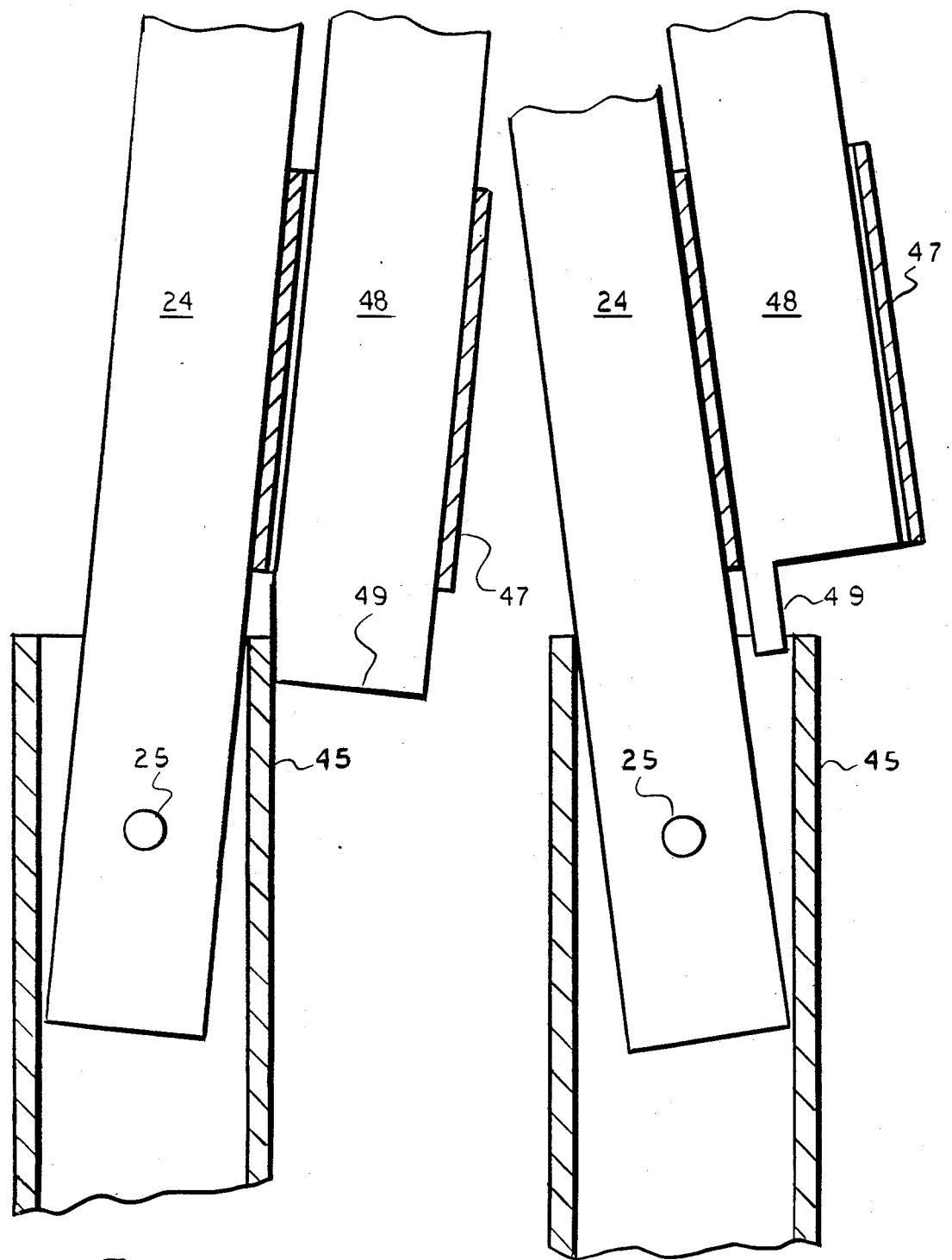

AUTOMATIC HEADGATE FOR LIVESTOCK

BACKGROUND OF THE INVENTION

This invention relates to livestock headgates, and more particularly to a livestock headgate adapted for rapid and positive automatic operation to secure animals of widely varying sizes.

Heretofore various diverse types of headgates have been used to restrain livestock, particularly cattle. In such headgates, the animal is restrained for treatment or grooming while standing on the ground and immobilized by having its head held in the headgate.

However, many of the headgates that have been used in the past are known to be dangerous, unwieldy, slow, and complicated in operation. Some are undependable, and are rarely adapted for long-term, maintenance free service. For example, one type of headgate in use comprises a V-shaped panel which supports the neck of an animal. This type of headgate is exceptionally undesirable in that in the event the animal slips or otherwise loses its footing, there is a possibility that the animal will be killed by breaking its neck, or that its breathing will be restricted due to pressure of the V-shaped panel on its neck. In the latter case, the animal must be bodily lifted in order to relieve the pressure and thereby restore breathing. Some V-shaped panel type headgates are provided with emergency release apparatus. However, the release feature is often of complicated operation, and considerably increases the cost of the headgate.

Another type of headgate that has been used heretofore is the stanchion gate. This type of headgate comprises a pair of vertically disposed neck-engaging bars which are pivotally supported at their bottom ends in a spaced apart relationship. The bars are adapted for pivotal movement between an open position wherein livestock are permitted to pass through the gate, and a closed position wherein the bars engage the sides of the neck of the animal to effect restraint of the animal.

The use of the stanchion type gate affords greater safety to the animal because the throat of the animal is not restrained. Since the stanchion gate does not require side gates, tail gates, etc., its operation is substantially faster and less complicated than would otherwise be the case.

A shortcoming of stanchion gates is that the neck-engaging bars generally do not close quickly and positively on the neck of the animal. Consequently, the bars sometimes catch the animal at the hips, requiring action by the operator to force the animal backwards out of the headgate. Another problem experienced in the use of stanchion gates is difficulty in making adjustments to accommodate various sizes of animals and horned animals.

It is accordingly an object of the present invention to provide a headgate of the walk-through stanchion type which is safer toward the livestock.

It is another object of this invention to provide a headgate as in the foregoing object having neck engaging means that are rapidly and automatically activated by the animal, and easily released by the operator.

It is a further object of the present invention to provide a headgate of the aforesaid nature of durable, easily operable, and minimal-maintenance construction.

These objects and other objects and advantages of the invention will be apparent from the following description.

SUMMARY OF THE INVENTION

The above and other beneficial objects and advantages are accomplished in accordance with the present invention by a headgate comprising:

(a) vertically elongated left and right gate frameworks, each having upper and lower horizontally disposed boundary members, upright interior and outer boundary members, forward and rearward faces, and rigid opaque panels disposed between said boundary members, said frameworks being pivotable upon said outer boundary members to permit horizontal swinging motion of said frameworks between a substantially coplanar disposition representing the closed state of the headgate, and an opposed forwardly directed parallel disposition representing the open state of the headgate, the upright interior boundary member of said right framework being pivotably joined to the lower horizontally disposed boundary member of the same framework so as to permit movement of said interior boundary member in the plane of the framework, and having an upper portion adjustably positionable within the plane of said right framework, the terminal upper extremity of said upper portion being slidably retained by the corresponding upper horizontally disposed boundary member, (b) a stationary upper horizontal bar extending between the upper extremities of the upright outer boundary members of said gates in pivotal engagement therewith and adapted to prevent rearward movement of said frameworks past their coplanar disposition, (c) a horizontally disposed floor beam extending between the lower extremities of the upright outer boundary members and in pivotal engagement therewith, (d) a connecting rod extending in pivotal interengagement between the upper horizontally disposed boundary members of the two frameworks in a manner such that said frameworks are mechanically coupled in their movements between said open and closed states, (e) latch means associated with the upper horizontally disposed boundary member of the right gate adjacent the right extremity thereof and adapted to engage said terminal extremity when the framework is in its open state, remain engaged in its closed state, and effect disengagement of said terminal extremity when the upright interior boundary member of the right framework is slightly displaced in a forward direction.

(f) spring means under tension associated with said terminal extremity in a manner to draw the upright interior boundary member of the right framework toward the upright interior boundary member of the left framework when said terminal extremity is disengaged from the latch means, (g) ratchet means interactive between said upper horizontal bar and terminal extremity to lock the position of the upright interior boundary member of the right framework after it has been drawn toward the upright interior boundary member of the left framework, (h) securing means associated with said horizontal bar for releasibly holding said frameworks in their closed state, (i) lever means associated with the upright outer boundary member of the left framework and adapted to permit manual pivotal movement of said frameworks between their open and closed states, (j) coupling means interactive with said lever means for releasing said securing means prior to manual movement of said frameworks to the open state, and restoring the holding position of said securing means with movement to the closed state, and (k) means for automatically restoring said terminal extremity to its latched position during the aforesaid movement of said frameworks.

In preferred embodiments, the headgate is fabricated of steel, with said boundary members and other components being of square tubular construction. Although, for convenience of description, the expressions "letf" and "right" have been employed, it is to be understood that such features may be reversed in their position.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIGS. 7 and 8 are enlarged fragmentary sectional views of a size-adjusting feature of the embodiment of FIG. 1.

DESCRIPTION OF THE PREFERRED EMBODIMENT

Figure 1:
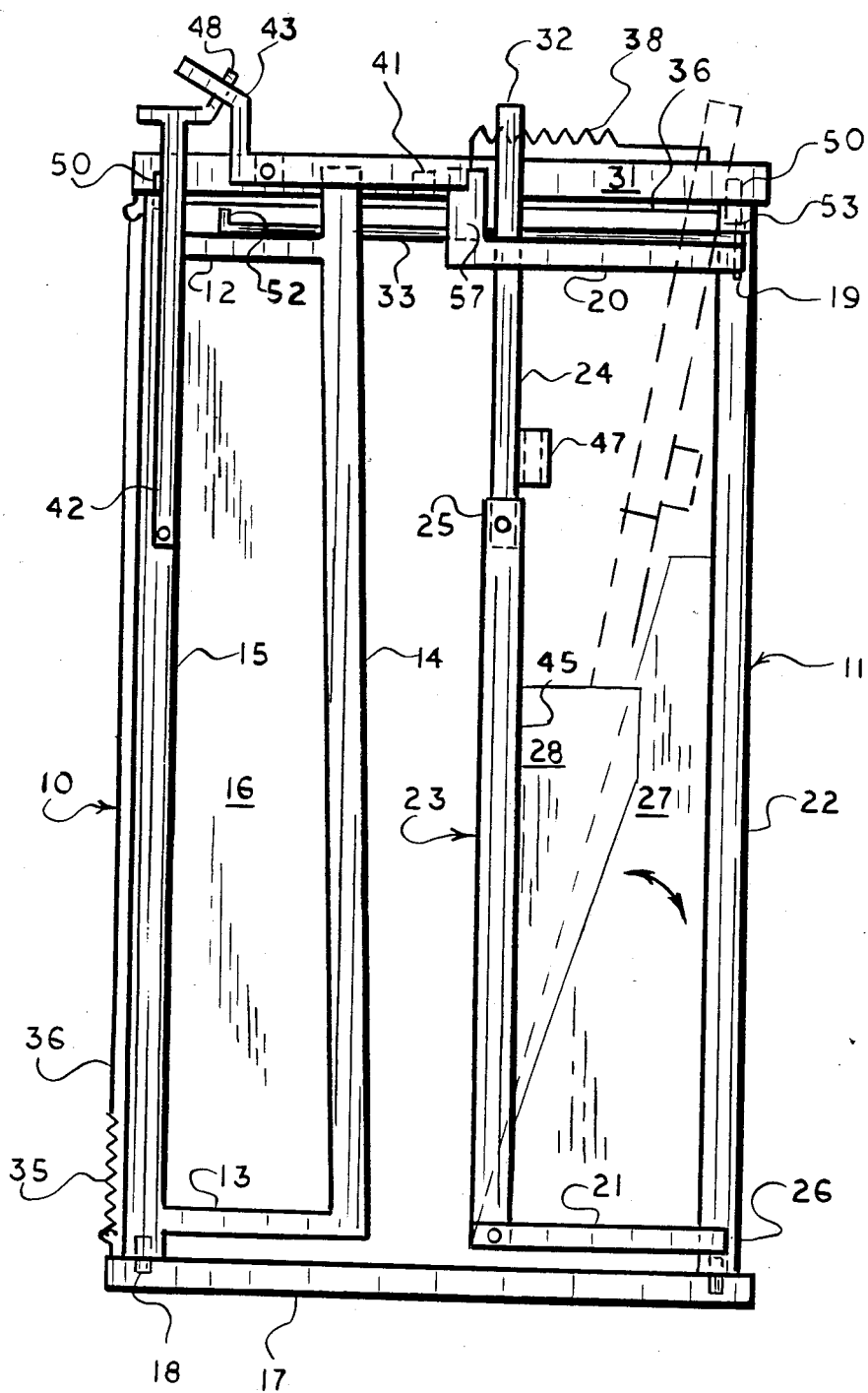
FIG. 1 is a front view of an embodiment of the headgate of the present invention in its closed state showing the position of the upright interior boundary member of the right framework in its closed position in solid line depiction, and in its open position in broken line depiction.

Referring to FIGS. 1-6, an embodiment of the headgate of the present invention is shown comprised of vertically elongated left and right gate frameworks 10 and 11, respectively. The left gate framework is comprised of upper and lower horizontally disposed boundary members 12 and 13, respectively, fabricated of solid flat steel in welded engagement with upright interior and outer boundary members 14 and 15, respectively, fabricated of square tubular steel. A steel plate panel 16 is disposed within the perimeter defined by said boundary members. The lowermost extremity of outer boundary member 15 engages the left extremity of floor beam 17 by means of pivot rod 18.

The right gate framework is comprised of upper horizontally disposed boundary member 19 constructed of two bars 20 in parallel horizontally spaced relationship, lower horizontally disposed boundary member 21, upright outer boundary member 22 in welded engagement with said upper and lower boundary members 19 and 21, respectively, and upright interior boundary member 23 pivotably joined to the left extremity of lower boundary member 21 in a manner to permit swinging movement of boundary member 23 within the plane defined by boundary members 19, 21 and 22. The lower extremity of upper portion 24 of boundary member 23 is inserted into the open upper extremity of tubular lower portion 45 of boundary member 23. As shown more clearly in FIGS. 7 and 8, pivot pin 25 secures upper portion 24 at a fixed elevation within lower portion 45 and further permits limited tilting positioning within the plane of the framework because the inside perimeter of tube 45 is larger than the cross-sectional outside perimeter of upper portion 24. Such arrangement enables said upper portion to be either a straight continuation of the lower portion of member 23 or to angle toward or away from boundary member 22 within the plane of the framework. Such adjustability is achieved by control means comprising square tube 47 welded to a face of upper portion 24, and square bolt 48 slidably held by tube 47 and whose lowermost extremity contains different abutment shapes 49 on three edges adapted to interact with the upper extremity of tube 45. As shown in FIG. 7, the abutment shape 49 grips the exterior of tube 45, causing upper portion 24 to be tilted to the right. When bolt 48 is removed from tube 47 and reinserted with 90 degree rotation, a different abutment shape 49 enters tube 45, causing portion 24 to be tilted to the left. In such manner, the separation between the opposed upright interior boundary members can be adjusted to accommodate differently-sized animals.

The terminal extremity 32 of upper portion 24 is slideably constrained between the two bars 20 of upper boundary member 19. Its lateral movement is limited by boundary member 22 and upright securing post 57 which are embraced by bars 20. The lowermost extremity of outer boundary member 22 engages the right extremity of floor beam 17 by means of pivot rod 26. A first steel panel 27 is disposed within the plane of the right framework by attachment to lower boundary member 21 and outer boundary member 22. A second steel panel 28 is attached to lower portion 45 of boundary member 23 and adapted to move therewith in its pivoted mode of motion. Panels 27 and 28 are separated sufficiently, front to rear, to permit movement of panel 28 in close adjacency to panel 27.

The left and right gate frameworks are further characterized in having forward and rearward faces 29 and 30, respectively.

Figure 4:
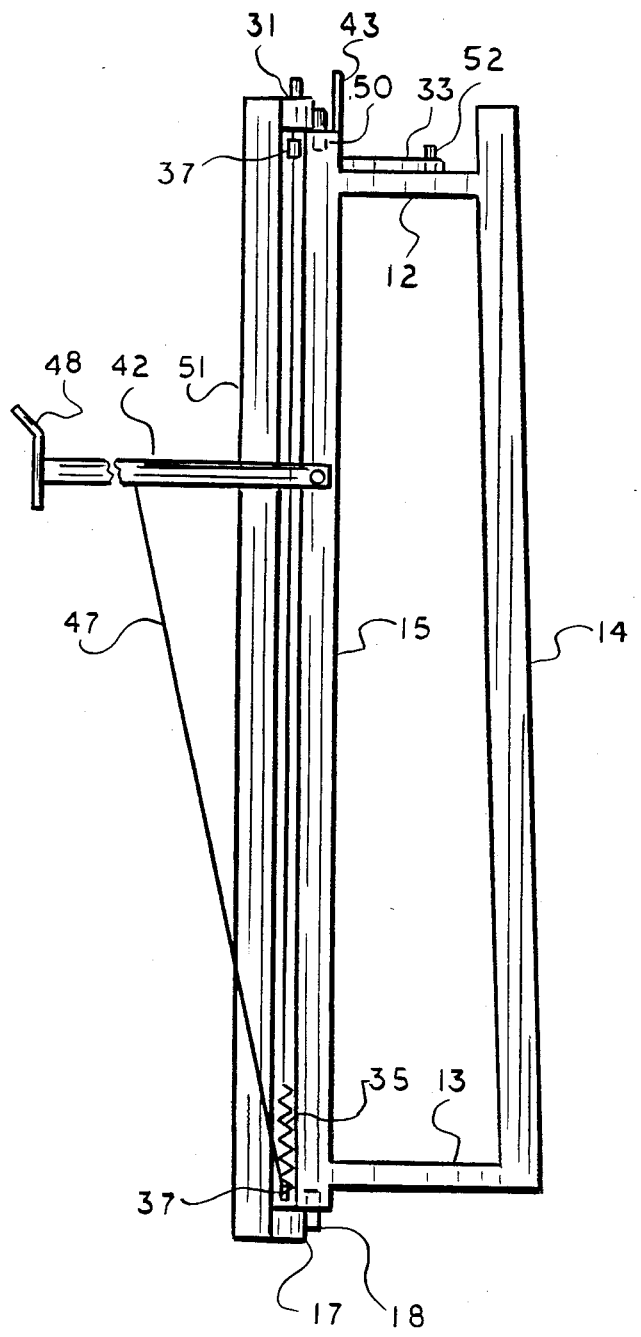
FIG. 4 is a left side view of the headgate shown in FIG. 2.
Figure 3:
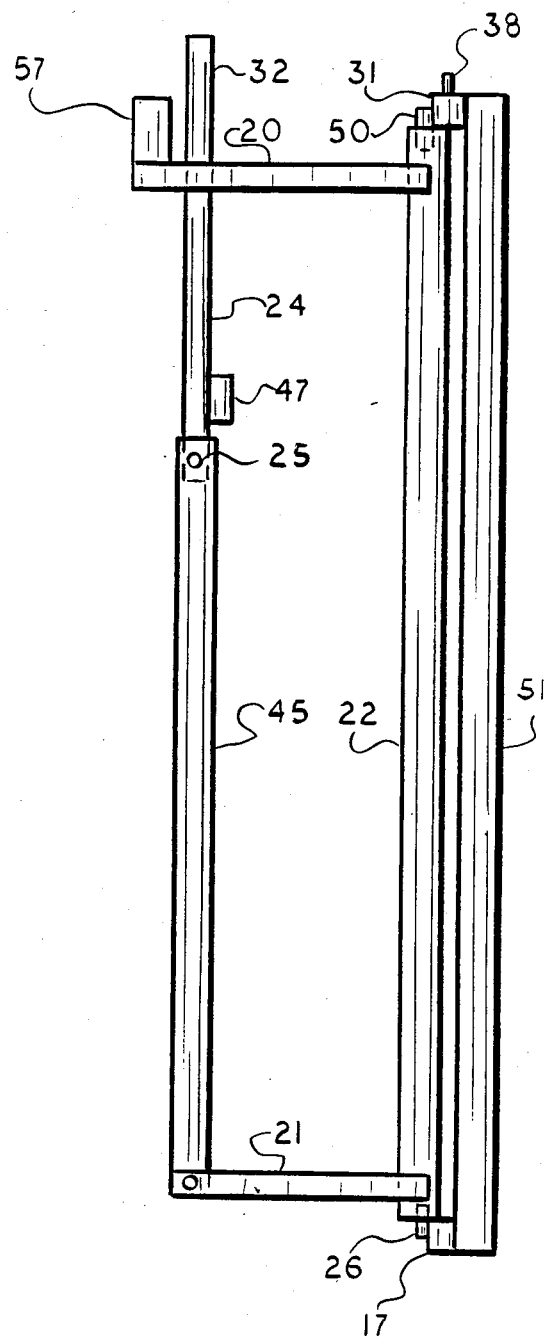
FIG. 3 is a right side view of the headgate shown in FIG. 2.

Stationary upper horizontal bar 31 extends between the upper extremities of the upright outer boundary members of said gates, engaging said extremities by pivot rods 50. In addition to aiding in the pivotal support of said gate frameworks, horizontal bar 31 serves as abutment means to prevent the swinging movement of said frameworks from going rearwardly beyond their position of coplanarity. As shown in FIGS. 3 and 4, horizontal bar 31 and floor beam 17 are held in spaced apart relationship by vertical wooden or steel posts 51.

A connecting rod 33 extends in pivoted interengagement between the upper horizontally disposed boundary members of the two frameworks in a manner such that manually urged swinging movement of the left gate framework causes corresponding movement of the right gate framework. In particular, the left extremity of rod 33 is joined to horizontally disposed boundary member 12 by pivot pin 52 located about 2 inches from corresponding upright boundary member 15, and the right extremity of rod 33 is joined to horizontally disposed member 19 by pivot pin 53 located at a site close to upright boundary member 22. Such construction causes the left gate to open ahead of the right gate, thereby allowing the gate to be opened even if the animal is leaning backwards.

Figure 5:
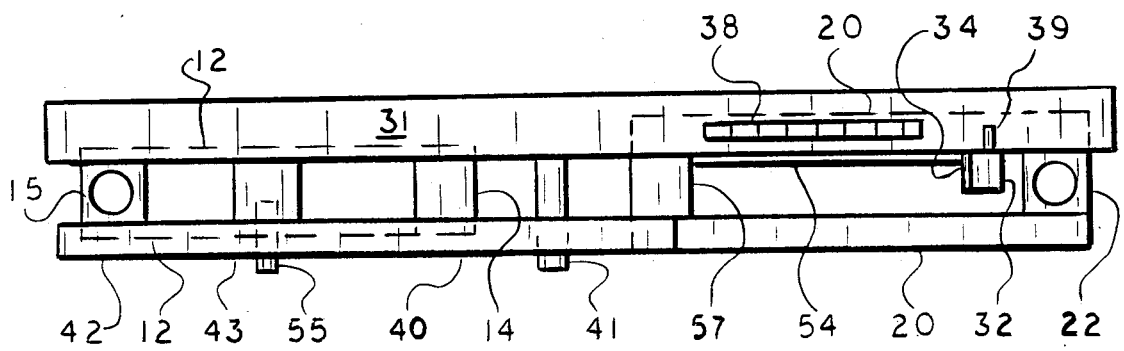
FIG. 5 is an enlarged top view of the headgate shown in FIG. 1.

As best shown in FIG. 5, a latching detent 34 is disposed upon rearward horizontal boundary bar 20 adjacent the right extremity thereof. Detent 34 is dimensioned and positioned to engage terminal extremity 32 in the closed state of the gate framework. When upright interior boundary member 23 is forwardly displaced, as by the shoulders of livestock, terminal extremity 32 leaves latching detent 34 for sliding movement within bars 20 toward the left gate framework.

Figure 6:
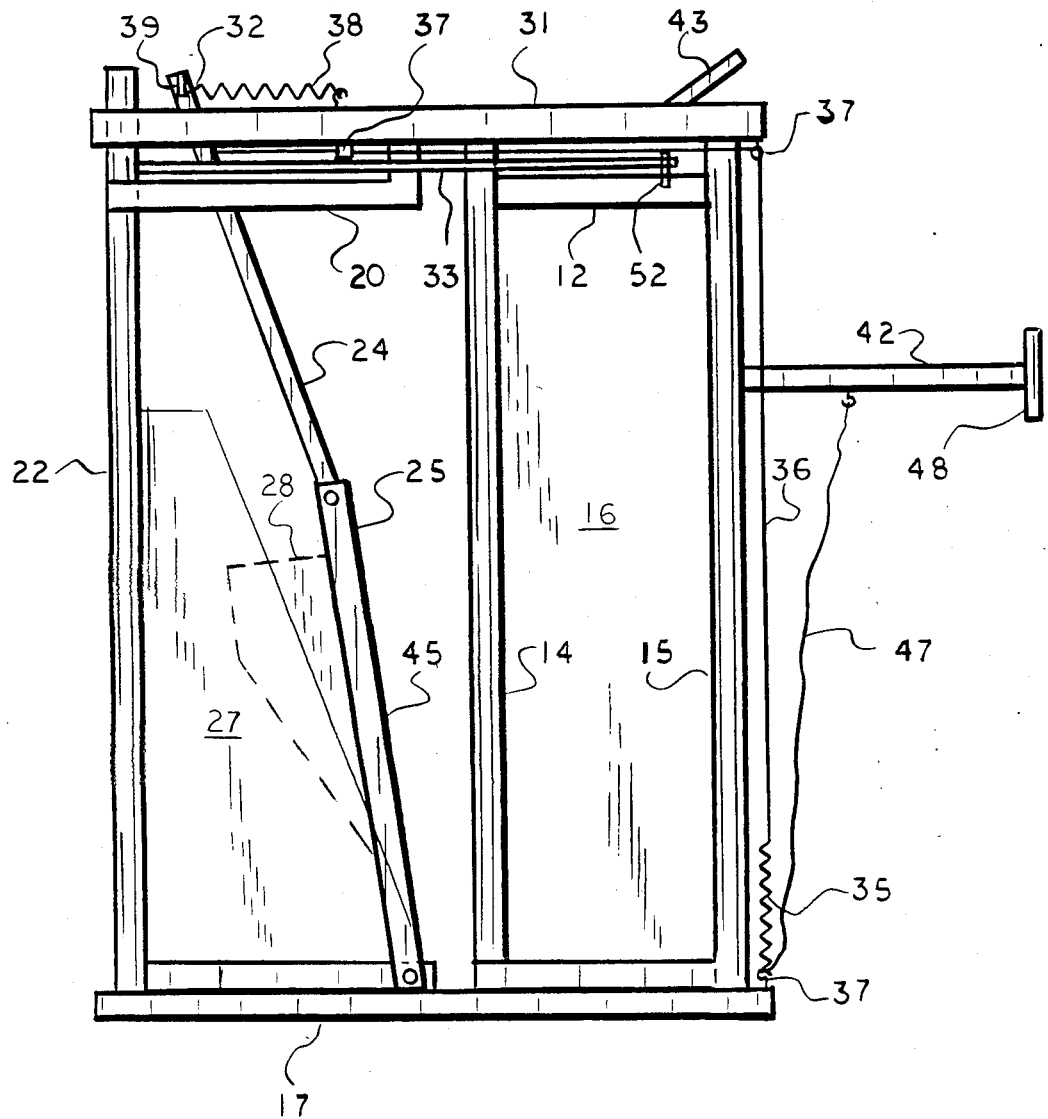
FIG. 6 is a rear view of the headgate shown in FIG. 1.

As best shown in FIG. 6, a coil spring 35 is disposed at the lower extremity of outer upright boundary member 15 of the left gate framework. A cable 36 extends upwardly from the upper extremity of spring 35, passes around guide wheels 37, and attaches to terminal extremity 32. Spring 35 is under tension when terminal extremity 32 is held by latching detent 34. When said terminal extremity is pushed by the shoulder of the animal from its position of securement within latching detent 34, boundary member 23 is rapidly forced toward the left gate assembly, thereby catching the livestock at its neck region. In order to enhance the sensitivity and speed of the action of boundary member 23, the surface of rear boundary bar 20, latching detent 34, and terminal extremity 32 that are in sliding contact are preferably lined with a durable plastic material such as ultra high density polyethylene. Detent 34 preferably constitutes the right edge of a slab 54 of such plastic material.

A series of ratchet-type teeth 38 are disposed in upright orientation upon the upper surface of horizontal bar 31, and positioned so as to become engaged by holding bar 39 extending rearwardly from terminal extremity 32. Such engagement occurs when boundary member 23 is in its far left position where it is closed upon the neck of the livestock.

Securing means in the form of bolt 40 pivotably attached to horizontal bar 31, and bracket 41 enable the gate frameworks to be locked in their closed or coplanar state, such being the state when an animal is engaged by interior boundary members 14 and 23. Bolt 40 is movable between locked and unlocked positions by control arm 43, integral with bolt 40 and disposed on the opposite side of pivot pin 55.

Figure 2:
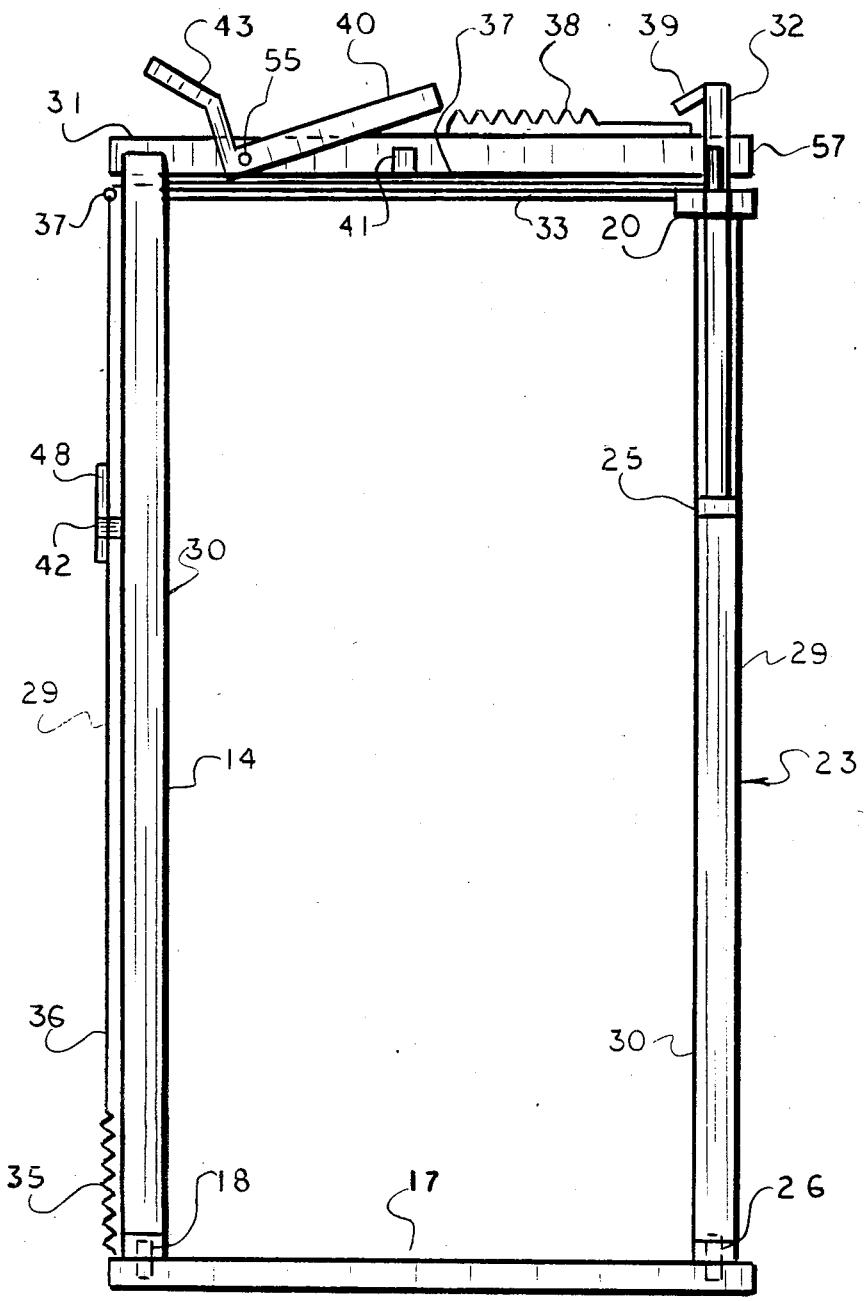
FIG. 2 is a front view of the headgate of FIG. 1 in its open state.

A manually operable lever 42 is pivotably attached to outer upright boundary member 15 of the left gate assembly. The free distal extremity of the lever has welded thereto activator means 48 which interacts with control arm 43 when the lever is in its upward position, thereby placing bolt 40 in its locking position. When pivoted downwardly, as shown in FIG. 2, control arm 43 is caused to raise bolt 40, thereby unlocking the interengaged frameworks. Manual movement of lever 42 rearwardly causes both gate frameworks to pivot forwardly, thereby releasing the held livestock. Said forward movement of framework 11 also restores extremity 32 to its cocked position within detent 34. This is achieved because holding bar 39 leaves ratchet teeth 38. Then, the tension applied to terminal extremity 32 through cable 36 passing around guide wheel 37 on horizontal bar 31 pulls the terminal extremity rearwardly to detent 34. When lever 42 is manually moved forward, the gate frameworks are brought back to their closed state. When lever 42 is manually pivoted to its vertical position, activator means 48 automatically engages control arm 43 to secure the gates in their closed, starting position.

A second cable 47 attaches to the lower extremity of spring 35, passes around guide wheel 37, and attaches to lever 42 at a site about 8 inches from the pivoted engagement of lever 42 with upright boundary 15. Such arrangement permits the closing force to be divided between the horizontal rotation of the left framework and the vertical rotation of lever 42. The arrangement also reduces the closing force when lever 42 is down and the gates are open to permit passage of the animal.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A livestock headgate for rapid and positive automatic operation in securing animals of varying sizes, said headgate comprising:
   (a) vertically elongated left and right gate frameworks, each having upper and lower horizontally disposed boundary members, upright interior and outer boundary members, forward and rearward faces, and rigid opaque panels disposed between said boundary members, said frameworks being pivotable upon said outer boundary members to permit horizontal swinging motion of said frameworks between a substantially coplanar disposition representing the closed state of the headgate, and an opposed forwardly directed parallel disposition representing the open state of the headgate, the upright interior boundary member of said right framework being pivotably joined to the lower horizontally disposed boundary member of the same framework so as to permit movement of said interior boundary member in the plane of the framework, and having an upper portion adjustably positionable within the plane of said right framework, the terminal upper extremity of said upper portion being slidably retained by the corresponding upper horizontally disposed boundary member,
   (b) a stationary upper horizontal bar extending between the upper extremities of the upright outer boundary members of said gates in pivotal engagement therewith and adapted to prevent rearward movement of said frameworks past their coplanar disposition,
   (c) a horizontally disposed floor beam extending between the lower extremities of the upright outer boundary members and in pivotal engagement therewith,
   (d) a connecting rod extending in pivotal interengagement between the upper horizontally disposed boundary members of the two frameworks in a manner such that said frameworks are mechanically coupled in their movements between said open and closed states,
   (e) latch means disposed upon said upper horizontal bar adjacent the right extremity thereof and adapted to engage said terminal extremity when the framework is in its closed state, and effect disengagement of said terminal extremity when the upright interior boundary member of the right framework is slightly displaced in a forward direction, (f) spring means under tension associated with said terminal extremity in a manner to draw the upright interior boundary member of the right framework toward the upright interior boundary member of the left framework when said terminal extremity is disengaged from the latch means, (g) ratchet means interactive between said upper horizontal bar and terminal extremity to lock the position of the upright interior boundary member of the right framework after it has been drawn toward the upright interior boundary member of the left framework, (h) securing means associated with said horizontal bar for releasibly holding said frameworks in their closed state, (i) lever means associated with the upright outer boundary member of the left framework and adapted to permit manual pivotal movement of said frameworks between their open and closed states, (j) coupling means interactive with said lever means for releasing said securing means prior to manual movement of said frameworks to the open state, and restoring the holding position of said securing means with movement to the closed state, and (k) means for automatically restoring said terminal extremity to its latched position during the aforesaid movement of said frameworks.

2. The livestock headgate of claim 1 wherein said boundary members are of square tubular steel construction.

3. The levestock headgate of claim 1 wherein the upper horizontally disposed boundary member of the right gate is comprised of forward and rearward elongated members in spaced apart parallel disposition serving to constrain therebetween movement of the terminal upper extremity of the upright interior boundary member of said right gate.

4. The livestock headgate of claim 3 wherein the sensitivity and speed of action of said latch means is enhanced by lining slidably contacting surfaces with a durable plastic material.

5. The headgate of claim 4 wherein said latch means includes a detent comprised of the right edge of an elongated slab of plastic material affixed to the rearward horizontally disposed boundary member of the right gate

* * * * *